UNITED STATES PATENT OFFICE.

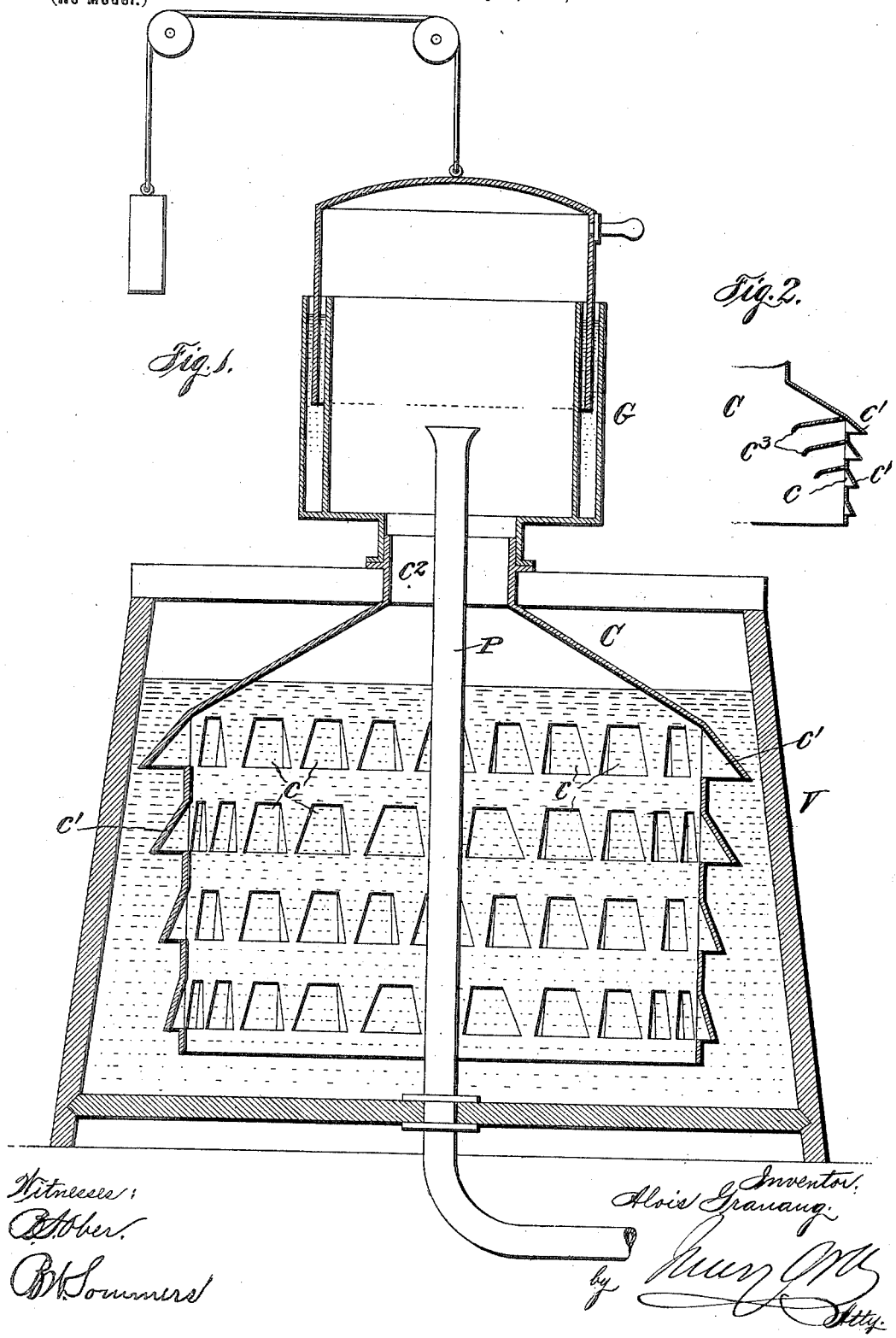

ALOIS GRAUAUG, OF DOLNA TUZLA, AUSTRIA-HUNGARY, ASSIGNOR OF ONE-HALF TO JOSEF KRANZ, OF VIENNA, AUSTRIA-HUNGARY.

PROCESS OF ACCELERATING ALCOHOLIC FERMENTATION AND RECOVERING THE VOLATILE GASEOUS PRODUCTS.

SPECIFICATION forming part of Letters Patent No. 668,144, dated February 12, 1901.

Application filed July 10, 1899. Serial No. 723,348. (No specimens.)

*To all whom it may concern:*

Be it known that I, ALOIS GRAUAUG, a subject of the Emperor of Austria-Hungary, residing at Dolna Tuzla, in the Province of Bosnia, in the Empire of Austria-Hungary, have invented certain new and useful Improvements in Processes of Accelerating Alcoholic Fermentations and Recovering the Volatile Gaseous Products; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

As is well known, the sugar in a fermentable material is converted or split up by fermentation into alcohol and carbon dioxid, and by-products are produced by subsidiary fermentation, such as volatile empyreumatic or volatile aromatic essential oils specific to the raw material, or evolved in such during preparatory treatment, these products being liberated and carried off by the carbon dioxid. It is also well known that the fermentation of a fermentable mash or wort proceeds more rationally and rapidly in the presence of atmospheric air and in proportion to the area of such mash or wort in contact with the air. Furthermore, the presence of the by-products above referred to is detrimental to the process of fermentation, and, as is well understood, all mechanical appliances for collecting and taking off these products from the surface of the fermenting mash or wort are disadvantageous rather than advantageous.

The object of my invention lies in the provision of means whereby the carbon dioxid and the volatile by-products are collected, I may say, as fast as formed or produced from as many points as possible within the body of the mash or wort and conducted out of the same into a collector, from whence they can then be taken and subjected to suitable treatment with a view to obtaining the carbon dioxid in a pure form; but that my invention may be fully understood I will describe the same in detail, reference being had to the accompanying drawings, in which—

Figure 1 is a vertical sectional view of a fermenting-vat organized to carry out my invention, and Fig. 2 is a fragmentary detail view illustrating a structural modification.

Referring to Fig. 1, V indicates an open fermenting-vat, preferably of a decreasing diameter in an upward direction, and P a pipe which extends axially through the vat into a gas-holder G, of well-known construction, mounted on the vat V in any desired or suitable manner. The gas-holder has a tubular foot, in which is secured the tubular neck of a collector C, consisting of a sheet-metal casing, which may be cylindrical or polygonal in cross-section, according as the vat V is of one or the other form in like section, said casing being of such vertical diameter that its lower open end will extend near to the bottom of said vat, as shown. The casing C is provided with a series of rows of apertures $c$, covered by louver-plates $c'$, and, as shown in Fig. 1, although the collector is of substantially uniform diameter and of but little less diameter than the smaller diameter of the vat V, the louver-plates $c'$ for the superposed rows of apertures $c$ are so constructed as to successively project nearer to the walls of the vat, the louver-plates for the upper row of apertures extending almost into contact with the walls of said vat. The collector C, as shown, is suspended in the fermentable mash or wort, so that all its apertures are below the surface thereof, whereby means are provided for facilitating the evolution of gas and volatile by-products at various levels within the mash or wort and their concentration within the collector and escape through the neck $c^2$ thereof into the gas-holder G, from which they may be conveyed through pipe P to any suitable purifying apparatus, either under their own pressure or by means of a pump.

To facilitate the flow of gas, &c., into the collector from the surrounding mash or wort, the apertures $c$ may be provided along their upper edges with inwardly-projecting deflecting-plates $c^3$, as shown in Fig. 2.

Having thus described my invention, what I claim as new therein, and desire to secure by Letters Patent, is—

The process, which consists in collecting the carbon dioxid and other volatile products of fermentation from different levels and from various points of said levels below the surface of a liquid under fermentation and while under a normal surface pressure, drawing off said gaseous and volatile products of fermentation so collected, and maintaining the normal surface pressure, for the purposes set forth.

In testimony that I claim the foregoing as my invention I have signed my name in presence of two subscribing witnesses.

ALOIS GRAUAUG.

Witnesses:
JOSEF RUBRAUCH,
ALVESTO S. HOGUE.